Feb. 10, 1953     J. G. BRADBURY     2,628,058
TAMPER PROOF PLUG VALVE
Filed Oct. 5, 1949

INVENTOR
James G. Bradbury
BY
Florian J. Miller
ATTORNEY

UNITED STATES PATENT OFFICE 2,628,058

TAMPERPROOF PLUG VALVE

James G. Bradbury, Erie, Pa., assignor to Hays Manufacturing Company, Erie, Pa., a corporation of Pennsylvania Application October 5, 1949, Serial No. 119,649

7 Claims. (Cl. 251—91)

This invention relates generally to plug valves and more particularly to a tamperproof plug valve to prevent disconnection thereof by unauthorized persons.

The stop plugs and the nuts on the depending threaded portions of the stop plugs in plug valves, especially in domestic gas lines, become corroded and frozen and do not turn. In many instances, persons in the household will attempt to rotate the plug through a conventional key and when it does not turn, they get a wrench and rotate the nut holding the plug in the valve body. The rotation of the nut on the threaded portion of the plug many times causes shearing of the threaded portion of the plug in engagement therewith wherein the plug is blown from the valve body by the pressure within the line with the result that fires, explosions and other damage results from the escaping gas. In some cases, the threads on the depending plug or the nut are stripped which allows the plug to blow out of the valve body.

It is, accordingly, an object of my invention to overcome the above and other defects in present plug valves and it is more particularly an object of my invention to provide a plug valve which is tamperproof, which is simple in construction, economical in cost, economical in manufacture, and efficient in operation.

Another object of my invention is to provide novel means in a plug valve to prevent the removal or blowing out of the plug therein by the removal of the nut holding the plug in the valve.

Another object of my invention is to provide novel retaining means in a plug valve in addition to the conventional washer and nut to secure a plug therein.

Another object of my invention is to provide novel retaining means for preventing unauthorized removal of a plug in a plug valve body which permits limited longitudinal movement of the plug.

Other objects of my invention will become evident from the following detailed description, taken in conjunction with the accompanying drawings, in which Fig. 1 is a vertical sectional view of my novel plug valve;

Figure 1:
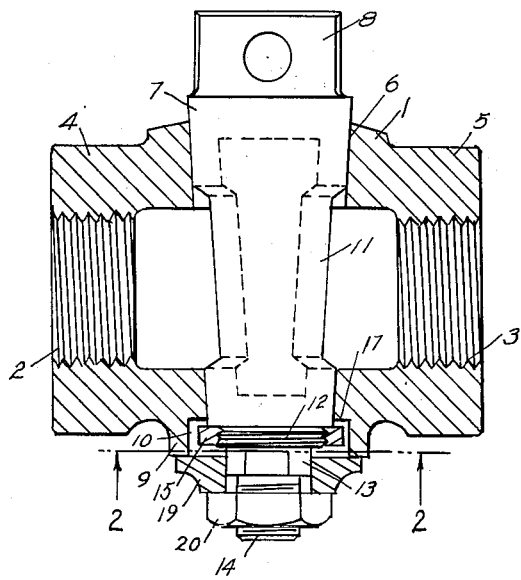

Referring now to the drawings, I show in Figs. 1, 2, 5 and 6 a plug valve comprising a cylindrical body 1 having aligned threaded apertures 2 and 3 extending laterally outwardly thereof in bossed portions 4 and 5 to provide an inlet and an outlet for the plug valve. The body 1 has a vertically extending, internally tapered seat 6 for seating a stop plug 7. The stop plug 7 has a laterally extending aperture 11 and a flat wrench engaging portion or key 8 on the upper end thereof for rotating the plug 7. A cylindrical skirt 9 depends from the body 1 and it provides an open, cylindrically shaped chamber 10.

Figure 2:
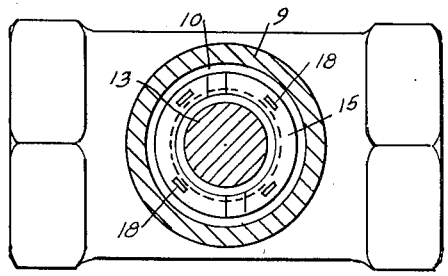
Fig. 2 is a view taken on the line 2—2 of Fig. 1.
Figure 5:
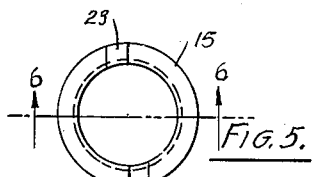
Fig. 5 is a plan view of the retaining ring shown in Figs. 1 and 2.

The plug 7 has a reduced threaded portion 12, a further reduced straight portion 13, and a threaded depending end 14. An internally threaded, annular retaining ring 15, shown particularly in Figs. 5 and 6, threadably engages the threaded portion 12 on the plug 7, the retaining ring 15 having diametrically opposed recesses 23 for receiving a wrench or the like. The retaining ring 15 is disposed within the chamber 10 formed by the skirted portion 9 and it is spaced from the shoulder 17 in the body 1 to permit limited longitudinal movement of the plug 7 so that the plug 7 may be tapped from the bottom when it is slightly frozen to free it. The retaining ring 15 is staked to the threaded portion 12 of the plug 7 by punching recesses 18 around the inner periphery of the ring 15 as shown in Fig. 2. A washer 19 engages the end of the skirted portion 9 of the body 1 and a threaded nut 20 threadably engages the threaded end 14 of the plug 7 to secure it on the seat 6 in the body 1. The retaining ring 15 is preferably made of a metal which is comparatively hard such as steel to make it difficult to remove the same by a chisel or the like.

In the assembly of my novel plug valve, it is merely necessary to dispose the plug 7 on the seat 6 of the body 1 as shown in Fig. 1, threadably engage the retaining ring 15 with the threaded portion 12 of the plug 7, stake the ring 15 on the threaded portion 12 of the plug 7, dispose the washer 19 on the reduced portion 13 of the plug 7, and threadably engage the nut 20 with the threaded end 14 of the plug 7. The ring 15 is disposed midway between the shoulder 17 and the washer 19 to permit limited longitudinal movement of the plug 7. The plug 7 may then be rotated by means of the key 8 to an open position with the aperture 11 therein aligned with the inlet and outlet apertures 2 and 3 as shown in Fig. 1 or in a closed position with the plug at right angles to its position shown in Fig. 1. The plug 7 may have a plain flat headed key or any other conventional type key without departing from my invention.

The retaining ring 15 is disposed in the chamber 10 formed by the skirted portion 9 so that it cannot be engaged by a pipe wrench. It is also difficult to remove it with a chisel and if a type of tool such as a chisel were used by an unauthorized person, there is enough play between the retaining ring 15 and the shoulder 17 of the body 1 that the plug 7 would be moved a very slight amount longitudinally so that the unauthorized person would be able to rotate the plug 7 by means of the key 8. Even though the threaded end 14 were sheared off, it will be evident that the retaining ring 15 will hold the plug 7 in an operative position. It will thus be seen that an unauthorized person will not be able to remove the retaining ring 15 with the ordinary tools at his disposal while the plug 7 may still be unfrozen by tapping the end thereof.

Figure 3:
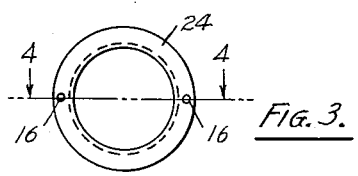
Fig. 3 is a plan view of a retaining ring, another embodiment for use in my novel plug valve shown in Figs. 1 and 2.
Figure 6:
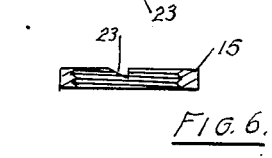
Fig. 6 is a view taken on the line 6—6 of Fig. 5.
Figure 4:
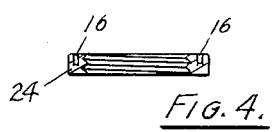
Fig. 4 is a view taken on the line 4—4 of Fig. 3.

A modified form of retaining ring is shown in Figs. 3 and 4 wherein, diametrically opposed holes 16 are formed in a threaded, cylindrical, annular ring 24 instead of the recesses 23 for a wrench as shown in the ring 15. The ring 24 can only be rotated in a clockwise direction so that once it is threadably engaged with the threaded portion 12 of the plug 7, it will be practically impossible to unthread it with a wrench or like tool.

From the foregoing, it will be seen that I have provided a tamperproof plug valve which prevents removal of the plug by the ordinary tools owned by a householder, which permits limited longitudinal movement of the plug to free same, which permits shearing of the threaded end of the plug while still maintaining a threaded connection to hold the plug in the plug valve, which has other structural elements for providing an efficient and durable plug valve with long life, and one in which a conventional plug valve may be utilized with a minimum of alteration.

Various changes may be made in the specific embodiment of my invention without departing from the spirit thereof or from the scope of the appended claims.

What I claim is:

1. A plug valve comprising a body having a depending open skirted portion, a tapered seat and an inlet and an outlet, a rotatable tapered plug disposed on said seat having an apertured portion for registration with said inlet and said outlet and having stepped, threaded portions on the smaller end thereof, a threaded retaining ring threadably engaging the larger of said threaded stepped portions disposed within the open skirted portion of said valve body, a washer surrounding one of said stepped portions on the smaller end of said plug and engaging the end of said open skirted portion, and a threaded member disposed adjacent said washer threadably engaging the smaller of said threaded stepped portions of said plug for securing it on its seat in said valve body, said retaining ring being of greater diameter than the smaller end of said plug engaging said seat to retain said plug in said valve body.

2. A plug valve as set forth in claim 1 wherein said body has a shoulder formed therein and said retaining ring is normally spaced a predetermined distance from said shoulder whereby said plug may be moved longitudinally a limited distance.

3. A plug valve comprising a valve body having a depending open skirted portion with a laterally extending shoulder, a tapered seat and a laterally extending inlet and outlet, a rotatable tapered plug disposed on said seat having an apertured portion for registration with said inlet and said outlet in said valve body and having reduced stepped portions on the smaller end thereof, the end and another of said stepped portions being threaded and separated by an unthreaded intermediate stepped portion, a threaded retaining ring engageable with the larger of said threaded portions and disposed within the skirted portion of said body, a washer disposed on the next succeeding reduced stepped portion and in engagement with the end of said open skirted portion, and a threaded nut threadably engaging the threaded end of said plug and engaging said washer to secure said plug on its seat in said valve body, said retaining ring being spaced from the shoulder in said valve body and from said washer to permit limited longitudinal movement thereof.

4. A plug valve as set forth in claim 3 wherein said retaining ring has diametrically opposed recesses for wrench engagement.

5. A plug valve as set forth in claim 3 wherein said retaining ring is staked to the threaded portion of said plug to which it is in engagement.

6. A plug valve as set forth in claim 3 wherein said retaining ring has triangular shaped recesses therein to permit rotation thereof by a wrench in a clockwise direction only.

7. A plug valve comprising a body having a tapered seat, an open skirted portion and a laterally extending inlet and outlet, a rotatable tapered plug disposed on said seat having an apertured portion intermediate thereof for registration with said inlet and said outlet and having a reduced threaded end depending from the smaller end thereof, a threaded retaining ring threadably engaging the reduced threaded end of said plug greater in diameter than the smaller end of said plug disposed within the skirted portion of said body to prevent unlimited longitudinal movement of said plug, a washer surrounding the reduced end of said plug and engaging the end of the open skirted portion of said valve body, and a nut threadably engaging the reduced threaded end of said plug for forcing said washer against the end of said skirted portion of said valve body and securing said tapered plug valve on its seat in said valve body.

JAMES G. BRADBURY.

REFERENCES CITED

The following references are of record in the file of this patent:

UNITED STATES PATENTS

| Number | Name | Date |
|---|---|---|
| 1,270,329 | Ruark | June 25, 1918 |
| 1,664,712 | Stanley | Apr. 3, 1928 |

FOREIGN PATENTS

| Number | Country | Date |
|---|---|---|
| 241,726 | Great Britain | Oct. 29, 1925 |